Oct. 30, 1956  L. MAWBEY  2,768,379
HEEL LOADING MACHINES
Filed March 17, 1955  12 Sheets-Sheet 5

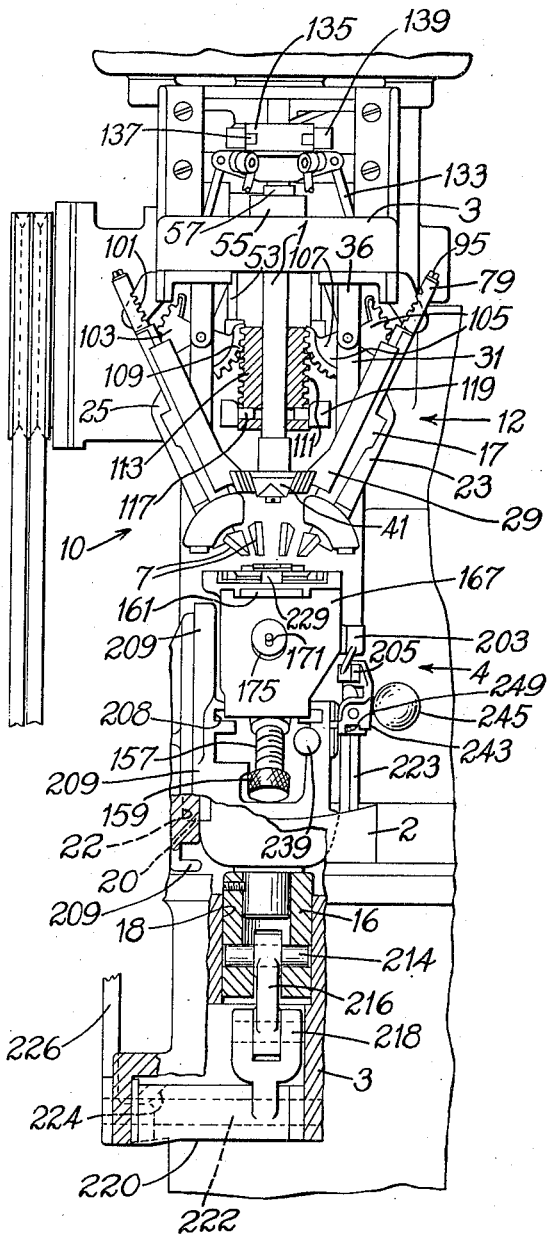

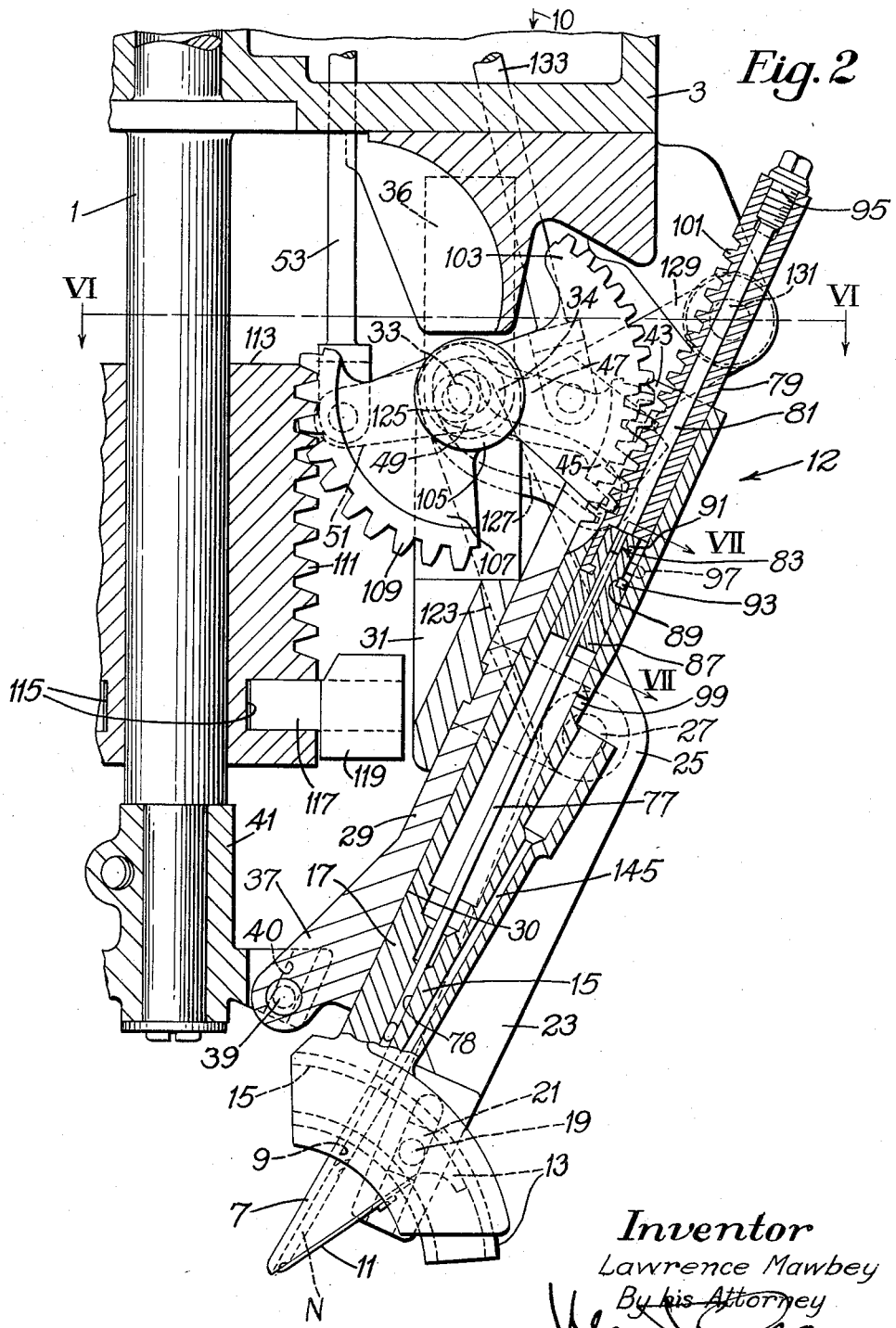

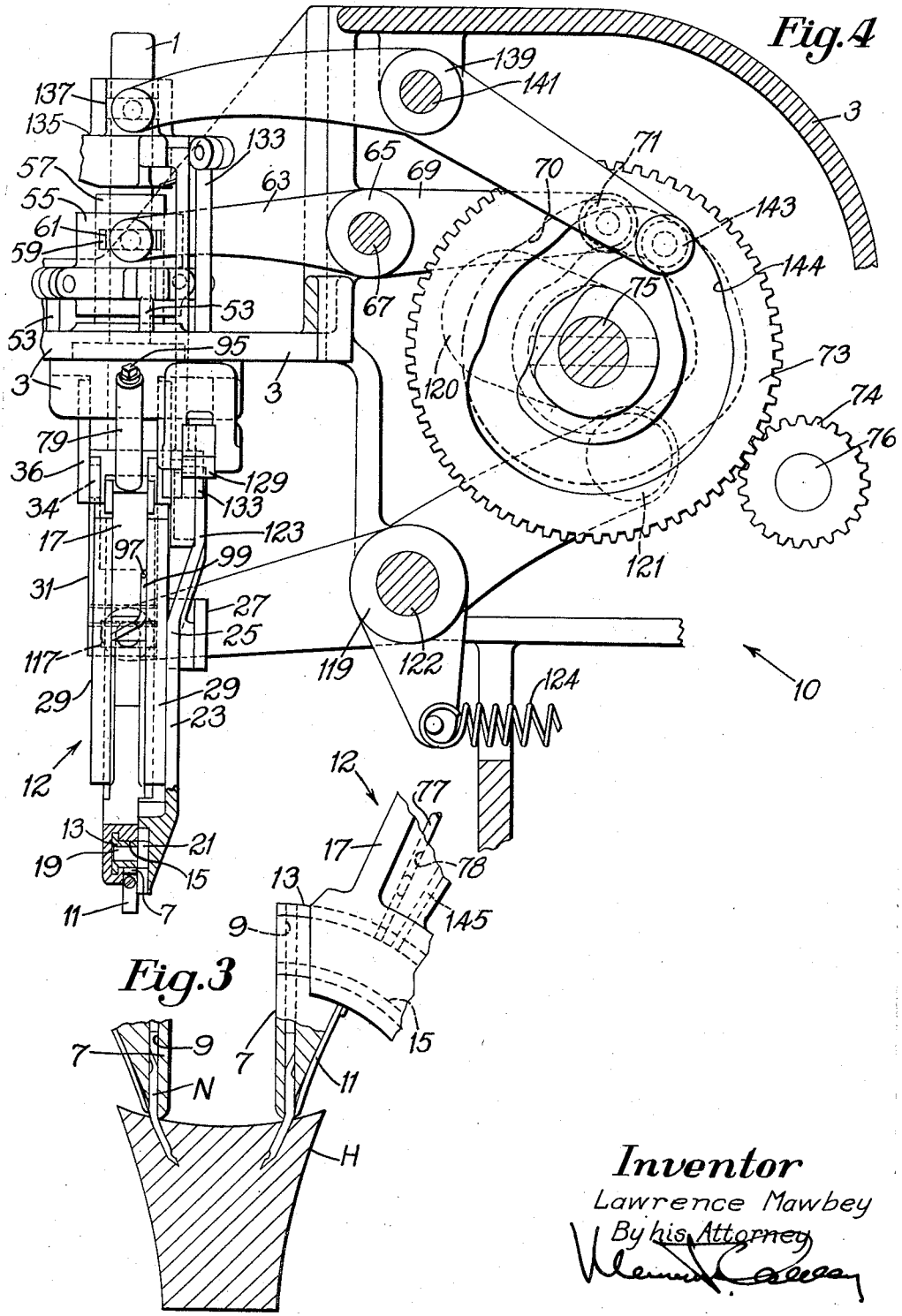

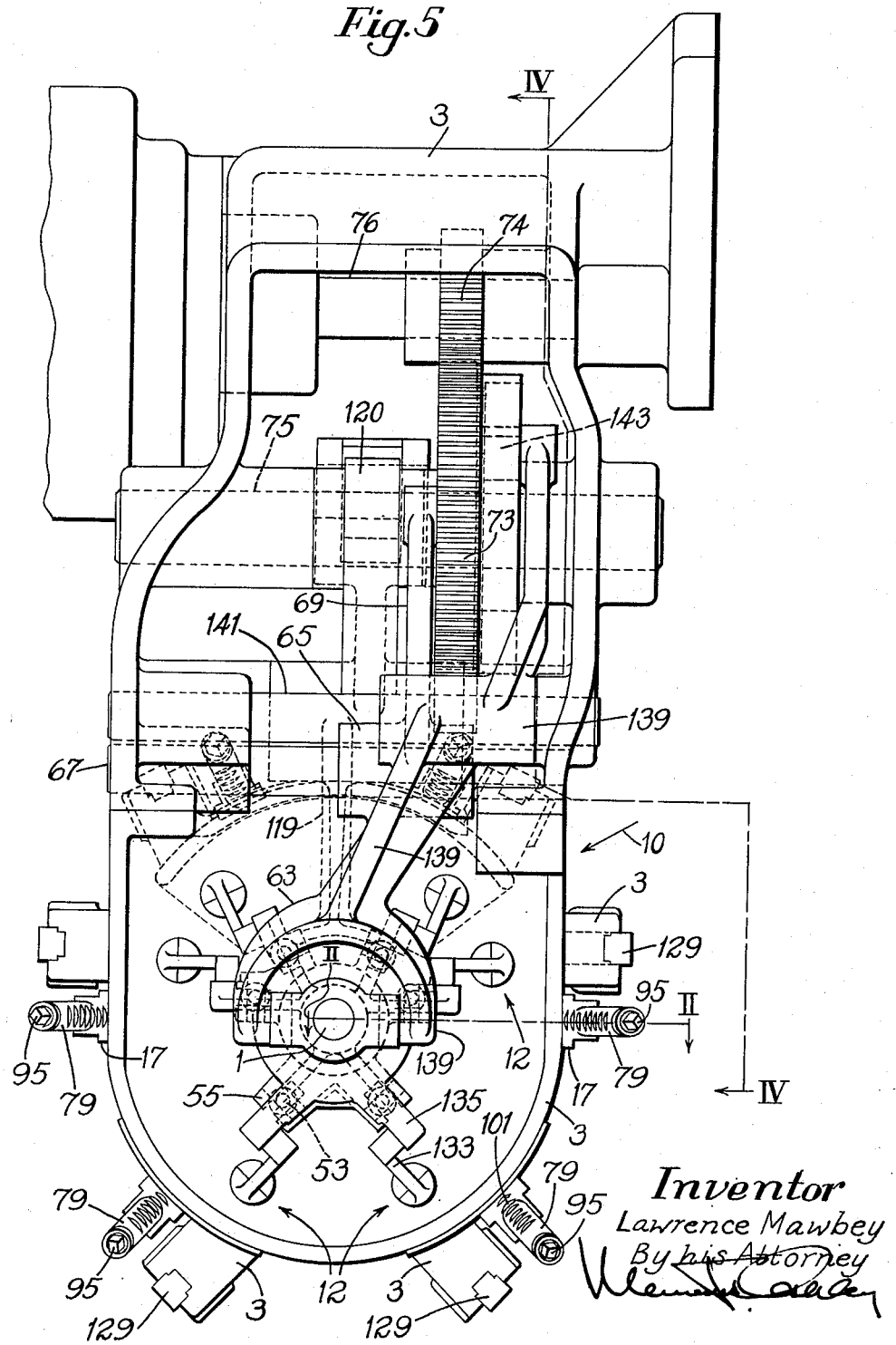

Inventor
Lawrence Mawbey
By his Attorney

Oct. 30, 1956          L. MAWBEY          2,768,379

HEEL LOADING MACHINES

Filed March 17, 1955          12 Sheets-Sheet 8

Inventor
Lawrence Mawbey
By his Attorney

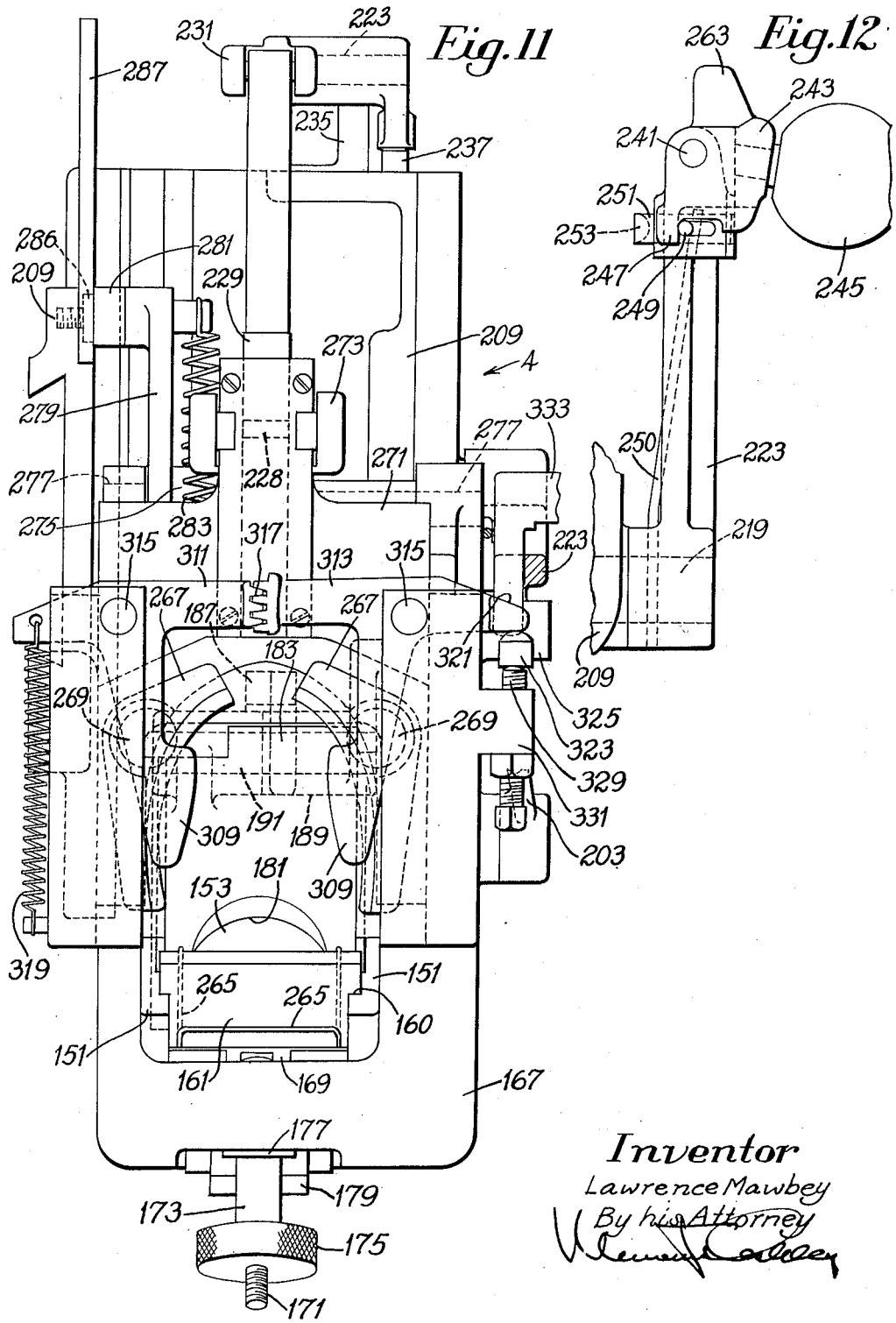

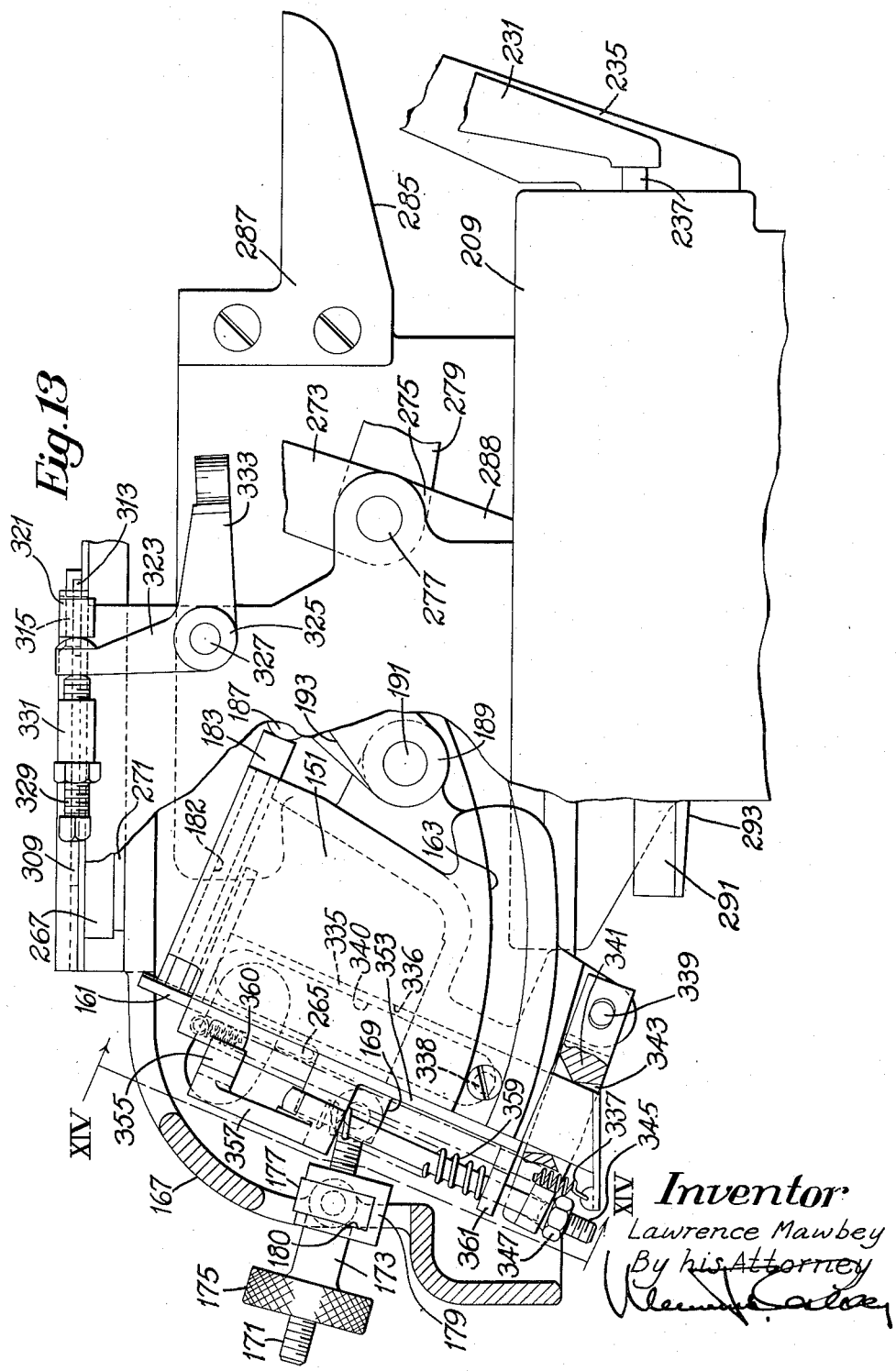

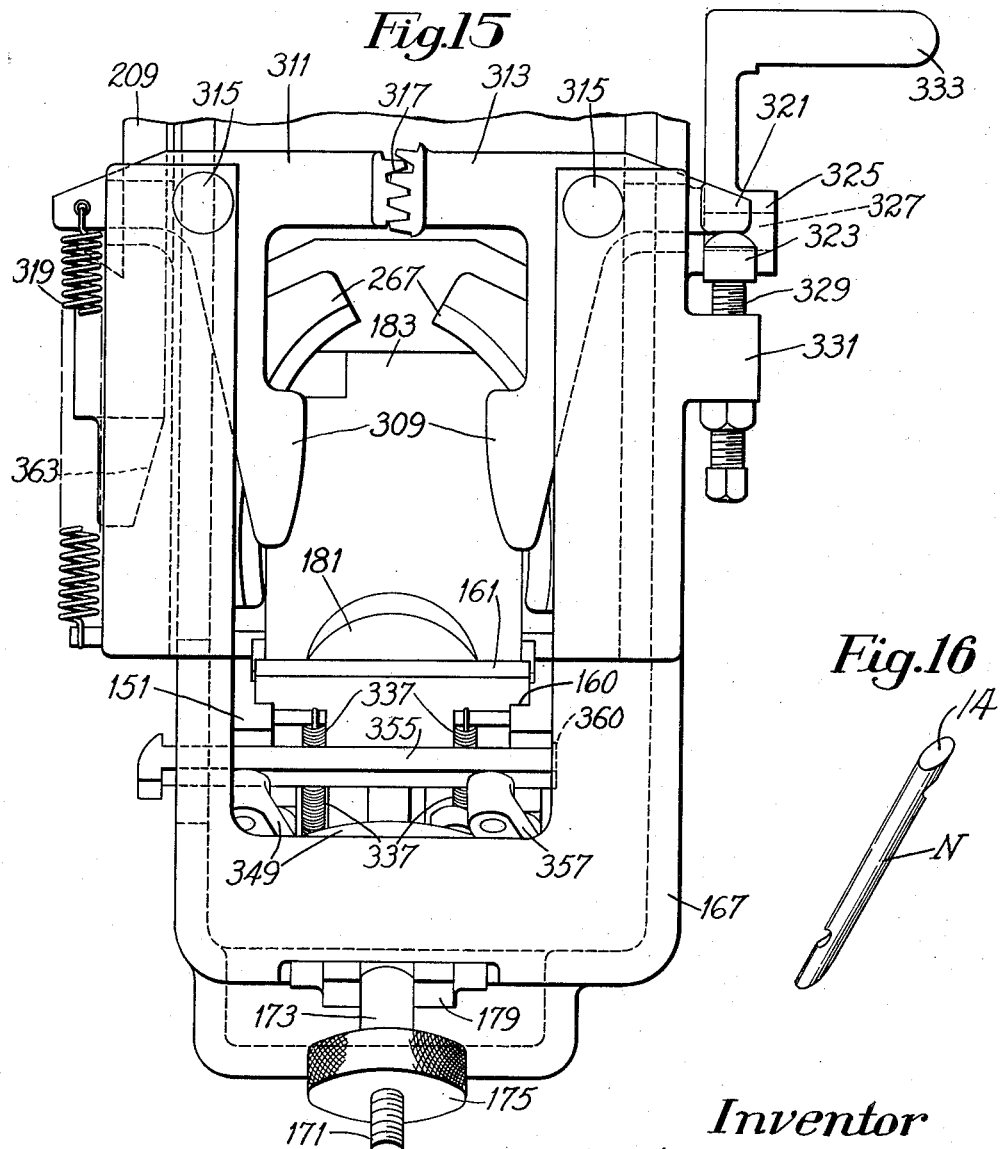

United States Patent Office 2,768,379
Patented Oct. 30, 1956

2,768,379
HEEL LOADING MACHINES

Lawrence Mawbey, Leicester, England, assignor to United Shoe Machinery Corporation, Flemington, N. J., a corporation of New Jersey Application March 17, 1955, Serial No. 494,849

Claims priority, application Great Britain March 26, 1954

27 Claims. (Cl. 1—203)

This invention relates to machines for loading wood heels preparatory to attaching said heels to shoes and is illustrated as embodied in a machine for use in the practicing of heel loading steps of the method disclosed in an application Serial No. 311,242, filed September 24, 1952, and issued as U. S. Letters Patent No. 2,722,-027 on November 1, 1955, in the names of Cyril H. James et al.

It is an object of the present invention to provide an improved machine for use in loading wood heels preparatory to attaching said heels to shoes by the commonly referred to push-on method disclosed in said application Serial No. 311,242. With the above object in view there is provided, in accordance with a feature of the invention, a machine having in combination, means for positioning and supporting a wood heel, means for driving nails in toed-in relation part way into the attaching face of the heel, leaving the remaining portions of said nails projecting beyond said face, and means for bending said remaining portions of the nails into parallel relation.

The present invention consists in the above and hereinafter described novel features, reference being had to the accompanying drawings which illustrate embodiments of the same selected for purposes of illustration, said invention being fully disclosed in the following description and claims.

In the drawings,

Fig. 1 is a front elevation, partly broken away, of the illustrative machine;

Fig. 2 is a section on the line II—II of Fig. 5 showing in detail one of six nail inserting and bending units of the illustrative machine;

Fig. 3 shows a transverse vertical section of a heel with nails driven therein and bent by the use of the machine;

Fig. 4 is a side elevation, partly broken away and partly in section on the line IV—IV of Fig. 5, showing portions of nail inserting and bending mechanism and driving means therefor;

Fig. 5 is a plan view of the nail inserting and bending mechanism;

Fig. 11 is a plan view of the heel holding mechanism;

Fig. 12 shows a hand lever and parts carried thereby viewed in the direction of arrow XII of Fig. 8;

Fig. 13 shows, partly in side elevation and partly in section, modified heel holding mechanism which may be used in place of the heel holding mechanism illustrated in Figs. 8 to 12;

Fig. 15 is a plan view of the heel holding mechanism shown in Figs. 13 and 14; and Fig. 16 shows in perspective one of the nails driven by the machine.

Figure 6:
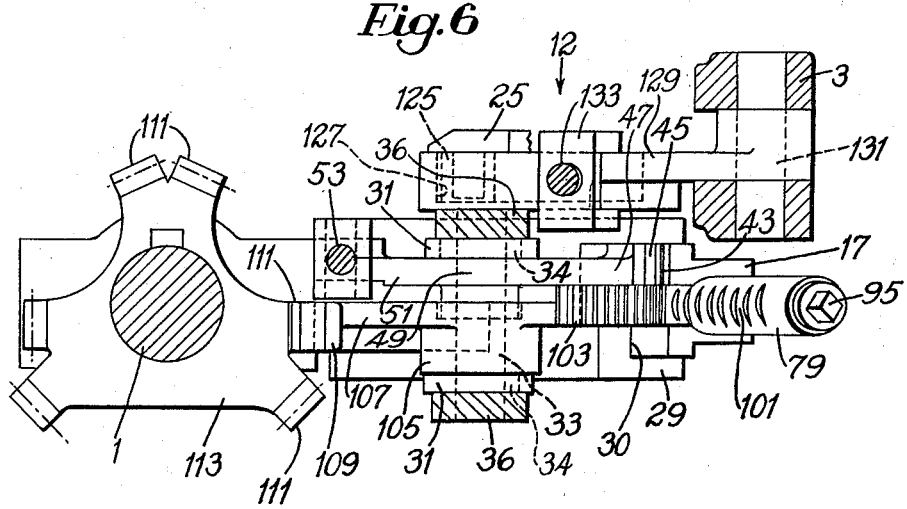
Fig. 6 is a plan view of one of the nail inserting and bending units partly on the line VI—VI in Fig. 2.

The illustrative machine is described with reference to driving nails N (Figs. 2, 3 and 16) in toed-in relation part way into previously drilled bores in the attaching or seat face of a wood heel H (Figs. 3 and 8) and thereafter to bending the portions of the nails left projecting from said attaching face into parallel relation, to "load" the heel preparatory to attaching the heel to a shoe (not shown) the heel seat of which has been pricked to receive the upstanding parallel portions of the nails.

The heel H which is to be loaded is mounted in a heel holding unit, jack or support 4 movable between raised active and lowered inactive positions, respectively, in a guide bracket 2 (Figs. 1 and 8) fixed to a main frame 3 of the machine. A heel support frame 209 of the heel holding unit 4 has formed on it a vertical guide portion 20 (Fig. 1) which is slidable along a vertical guideway 22 formed in the guide bracket 2, said support frame being secured to a plunger 16 vertically movable in a guideway 18 of the main frame 3 of the machine, said plunger being raised and lowered to cause the heel holding unit 4 to be moved between said raised active and lowered inactive positions by mechanism which will be hereinafter described. While the heel holding unit 4 is in its raised active position the nails N are driven into the heel H secured in said unit and have their projecting portions bent into parallel relation, as above described, by nail inserting and bending mechanism 10 which comprises six similar nail driving and bending units 12 arranged around or circumferentially of a vertical guide shaft 1 which is fixed in the main frame 3.

Each of the six nail inserting and bending units 12 comprises a nozzle 7, the nozzles being so arranged that nails N inserted through them into the attaching face of the heel H are disposed in the positions disclosed in said application Serial No. 311,242. Each nozzle 7 has in it a nail and driver passage 9 (Figs. 2 and 3) which, initially, extends upwardly and outwardly away from the vertical guide shaft 1 at an angle of substantially 25° to said shaft. The nails N are fed to the nail and driver passages 9 from a nail assorting and delivering mechanism (not shown) of the machine and each nozzle has secured to it a leaf spring 11. The upper end of each of the leaf springs 11 is secured to an associated nozzle 7 and the lower end of each of said springs extends part way across the lower or exit end of the nail and driver passage 9 and prevents the nails N from dropping out of the passage and is also usually engaged by a leading flat beveled end 14 of the nail which is dropped into the passage. The lower points of the nails N project a little below the bottoms of the nozzles 7 and the engagement of the lower ends of the springs 11 with beveled faces 14 on the lower end portions of the nails tends properly to orient the nails about their respective axes. It has been found that the spring 11 sometimes fails properly to orient the nail N and accordingly, other means hereinafter described is provided to insure that the nail is always oriented properly about its axis as it is driven into the heel.

When the nozzles 7 are moved downwardly in converging rectilinear paths, as will hereinafter appear, their lower ends adjacent to the exit ends of the passages 9 are moved into, or substantially into engagement with the attaching face of the heel H supported by the heel holding unit. An arcuate upper end portion 13 of each of the nozzles is supported by and slidingly mounted in an arcuate guideway 15 in the lower end portion of an associated nozzle carrier 17. The arcuate guideway 15 is concentric with the lower end of the nozzle 7 so that movement of the nozzle along the guideway 15 does not alter the position of the lower end of the nozzle but, as hereinafter described, causes the bending of the projecting portion of the nail N, which nail is then partly in the heel and partly in the passage 9 of the nozzle. Each of the nozzles 7 carries a horizontal pin 19 (Figs. 2 and 4) having pivoted on it a block 21 which fits slidingly in a slot in a forked lower end portion of one arm 23 of a nozzle lever 25, hereinafter referred to, which is pivoted on a horizontal pin 27 secured to a guide or guide member 29 provided with a slideway or guideway 30 (Figs. 2 and 6) in which the nozzle carrier 17 is slidingly mounted for translatory movement. The six guideways 30 converge as they extend downward and are spaced circumferentially of the vertical guide shaft 1.

The guide member 29 is secured to an upwardly extending block 31 which is pivoted on a horizontal pin 33 carried by bosses 34 on the insides of plates 36 secured to the main frame 3. The lower end portion of the guide member 29 has extending from it inwardly towards the vertical guide shaft 1 a thin lug 37 (Fig. 2) having extending through it a horizontal pin 39 end portions of which fit slidingly in grooves 40 in a controlling member 41 detachably secured to the lower end portion of said guide shaft 1. It will be understood that the controlling member 41 has six such pairs of grooves 40 one for accommodating each nail inserting and bending unit 12. The controlling member 41 controls the angular positions of the six guide members 29 about the pins 33, and therefore the relative positions of the lower ends of the nozzles 7. By exchanging one controlling member 41 for another having different pairs of grooves 40 the relative positions of the lower ends of the nozzles 7 may be varied to accommodate the particular heel H being loaded with the nails N.

The upper end portion of each nozzle carrier 17 above the upper end of the guide member 29 has formed along it rack teeth 43 which are engaged by a gear segment 45 on the outer end of one arm 47 of a substantially horizontal carrier actuating lever 49 which is pivoted on the pin 33 on which the supporting block 31 for the guide member 29 is pivoted. Accordingly, adjustment of the guide member 29 about the pin 33 does not alter the heightwise position of the nozzle carrier 17 or the nozzle 7 in the guide member. Each carrier actuating lever 49 has another arm 51 which extends towards the vertical guide shaft 1. Each of these arms 51 is pivotally connected to the lower end portion of a link 53. The upper end portions of the links 53 are pivotally connected to a nozzle carrier actuator 55 (Fig. 4) which is slidingly mounted on an upwardly extending central sleeve portion 57 of the main frame 3, in which sleeve portion the vertical guide shaft 1 is secured. It will be understood that up and down movement of the nozzle carrier actuator 55 moves the nozzle carriers 17 simultaneously along the guideways 30 of associated guide members 29. The nozzle carrier actuator 55 has in each side of it a recess 59, which recesses are engaged by blocks 61 pivoted on studs secured in the forked front end of one arm 63 of a cam lever 65 which is pivoted on a horizontal spindle 67 extending laterally of the machine and supported in the main frame 3. An arm 69 of the cam lever 65 extends rearwardly and carries a cam roll 71 which engages a cam groove 70 in a cam 73 secured to a countershaft 75, rotatably mounted in the main frame 3. Upward movement of the nozzle carrier actuator 55 causes the nozzle carriers 17 and nozzles 7 to move downwardly. During each cycle of the machine the cam 73 is driven through a complete revolution by a gear 74 secured to a shaft 76 operatively connected to a source of power.

Figure 7:
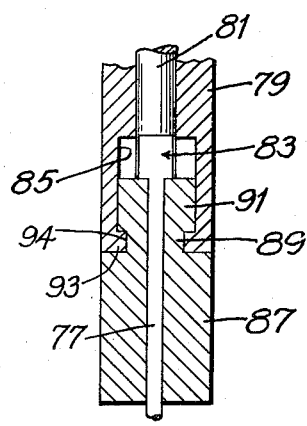
Fig. 7 shows on an enlarged scale portions of nail driving mechanism viewed on the line VII—VII of Fig. 2.

Each nozzle carrier 17 has slidingly mounted in a bore 78 thereof a nail driver 77. The lower end portion of the nail driver 77 is formed with a point provided by beveling the driver from one side of its end portion to the other at an angle equal to the angle of the beveled face 14 at each end of the nail, the beveled face or end on the nail driver engaging the trailing beveled face on the nail during the driving of the nail into the heel. The upper end portion of the driver 77 is rotatably mounted in a rack bar 79, hereinafter referred to. The upper portion 81 (Figs. 2 and 7) of the nail driver 77 (Fig. 7) is slightly larger in diameter than the lower end portion and the upper portion has formed on its lower end just above the lower portion two parallel flat faces 83 one at each side of the axis of the driver. The portion of the driver 77 with the flat faces 83 thereon engages in a recess 85 extending across the top of a thimble 87 and downwardly thereinto, the lower portion of the driver passing through the thimble. The thimble 87 is slidably and rotatably mounted in the nozzle carrier 17 and the flat faces 83 on the driver and the recess 85 in the thimble cause the driver to rotate with the thimble. The thimble 87 comprises a lower body portion and a neck 89 joining the body portion to a head 91, which neck is smaller in diameter than the head. The head 91 and neck 89 of the thimble 87 are seated in a recess in the lower end of the rack bar 79, the upper face of the head engaging the upper face of the recess and an inwardly projecting portion 93 (Fig. 2) of the rack bar 79 engaging in a circumferential channel 94 of the thimble. The arrangement is such that the thimble 87 and driver 77 move up and down with the rack bar 79 and the thimble and driver may rotate relatively to said bar. A screw 95 in the upper end of the rack bar 79 engages the upper end of the driver 77 and prevents the driver from moving upwardly in the thimble 87 and the rack bar 79.

The head of the thimble 87 has projecting from it a pin 97 which engages a cam groove 99 (Figs. 2 and 4) in the nozzle carrier 17 in which the rack bar 79 is slidingly mounted. The cam groove 99 is so formed that as the rack bar 79, thimble 87 and the driver 77 descend the thimble and driver are rotated through approximately 90°. During this rotation and downward movement of the driver 77 its lower beveled end or face will, if the nail in the nozzle has not become correctly oriented by the spring 11 as it dropped into the passage, engage the beveled face 14 at the upper end of the nail and will turn the nail into its proper position.

The rack bar 79 has on its upper end portion, on the side thereof nearest the vertical guiding shaft 1, rack teeth 101 which mesh with a gear segment 103 on one arm of a driver actuating lever 105 which is pivoted on the same pin 33 as the guide member 29 is pivoted. The driver actuating lever 105 has a second arm 107 provided with a gear segment 109 which meshes with rack teeth 111 on a driver actuator 113 slidingly mounted on the vertical guiding shaft 1. The driver actuator 113 has formed in it two recesses 115, one at each side of the vertical guiding shaft 1, which are engaged by blocks 117 carried by one arm of a cam lever 119 which is secured to a rock shaft 122 pivotally mounted in the main frame 3. The cam lever 119 has another arm which carries a cam roller 121 which is held up against a cam 120 on the countershaft 75 by a spring 124. It will be understood that the driver actuator 113 actuates all the six drivers 77 simultaneously. Since the driver actuating lever 105 is pivoted on the same pin 33 as the guide member 29 no up or down movement of the driver will occur if the guide member is adjusted about said pin.

The aforesaid nozzle lever 25 (Figs. 2 and 6) has an upwardly extending arm 123 which carries a cam roller 125. The cam roll 125 engages a cam groove 127 in an end portion of a cam arm 129 which is pivoted on a horizontal pin 131 secured to the main frame 3. The end of the cam arm 129 in which is formed the cam groove 127 is nearer to the vertical guide shaft 1 than the pin 131. The cam arm 129 has pivoted to it, between its ends, a lower end portion of a link 133, the upper end portion of which is pivotally connected to a nozzle actuator 135 (Figs. 1 and 4) which is slidingly mounted on the vertical guide shaft 1 above the nozzle carrier actuator 55. The nozzle actuator 135 has formed in it two recesses in which engage slidingly blocks 137 pivoted in a forked end portion of a cam lever 139 which is pivoted on a horizontal shaft 141 secured to the main frame 3 and which carries a cam roll 143 which engages a cam groove 144 in the cam 73 on said countershaft 75. The arrangement is such that when the nozzle actuator 135 is moved up and down all the nozzles 7 are moved along their arcuate guideways 15 in the nozzle carriers 17. When the nail inserting and bending mechanism is at rest the cam roll 125 in the cam groove 127 in the cam arm 129 is substantially axially in alinement with the aforesaid pin 33 on which the guide member 29 is pivoted and therefore if the guide member is adjusted about the pin, to suit the size of the heel, the position of the cam roll is not altered and the nozzle 7 is not to an appreciable extent moved, by such adjustment, in the arcuate guideway 15 in the nozzle carrier 17.

The cam roll 125 and the pin 33 are in axial alinement when the driver passage 9 in the nozzle 7 has been moved into alinement with the bore 78 in which the nail driver 77 is movable and accordingly the relative positions of the passage and the bore remain constant although the controlling member 41 may be changed.

When the nail inserting and bending units 12 are in their stopped positions the driver passages 9 in the nozzles are in alinement with bores 145 in the associated nozzle carriers 17 down which nails are supplied to the nozzles and which may be referred to as nail delivering bores so that, during the time that the units are at rest between successive heel loading operations of the machine, nails may be fed into the nozzles. The nozzles 7 are thereafter moved along the arcuate guideways 15 in the nozzle carriers by the arms 23 until the driver passages 9 are in alinement or register with the bores 78 in which the nail drivers 77 slide. The nozzles 7 may be said to be in primary and secondary positions when their passages are in alinement with the nail delivering and the driver bores 145, 78 respectively. The nail drivers 77 are then moved downward into the bores 78 of the nozzle carriers 17 and into the passages 9 of the nozzles 7 and push the nails part way out of the nozzles and simultaneously therewith orient the nails as hereinbefore described, if necessary. Immediately thereafter the drivers 77 and the carrier 17 and accordingly the nozzles are moved downward together or as a unit and the portions of the nails projecting from the nozzles are thrust into the heel H, downward movement being limited when the lower ends of the nozzles are in substantial engagement with the attaching face of the heel. The drivers 77 are then retracted or moved upwardly with relation to the carrier 17 until their lower ends have moved out of the passages 9 of the nozzle 7. The nozzles 7, after being moved to their lowered positions and after the drivers 77 have been removed from the passages 9, are moved along their arcuate guideways 15 by upward movement of the nozzle actuator 135, to bend as entireties into parallel relation the portions of the nails, then in the passages 9 and projecting from the heel, to their positions shown in Fig. 3. After the nails have been bent into parallel relation the heel holding unit or jack 4 is lowered, by mechanism above referred to and hereinafter described, thereby causing the nails then in the passages 9 of the nozzle 7 to be withdrawn from said passages, the various operative parts of the nail inserting and bending units 12 then returning to their starting positions and the jack finally returning to its raised active position. Each of the nozzles 7 may be described as being tapered and as having an apex portion and a passage 9 which is provided with an exit end terminating at said apex portion. The axes, about which the nozzles 7 of the units 12 are rocked into positions in which their passages 9 are in parallel relation, are parallel to the axes of the pins 33 respectively of the units.

Figure 8:
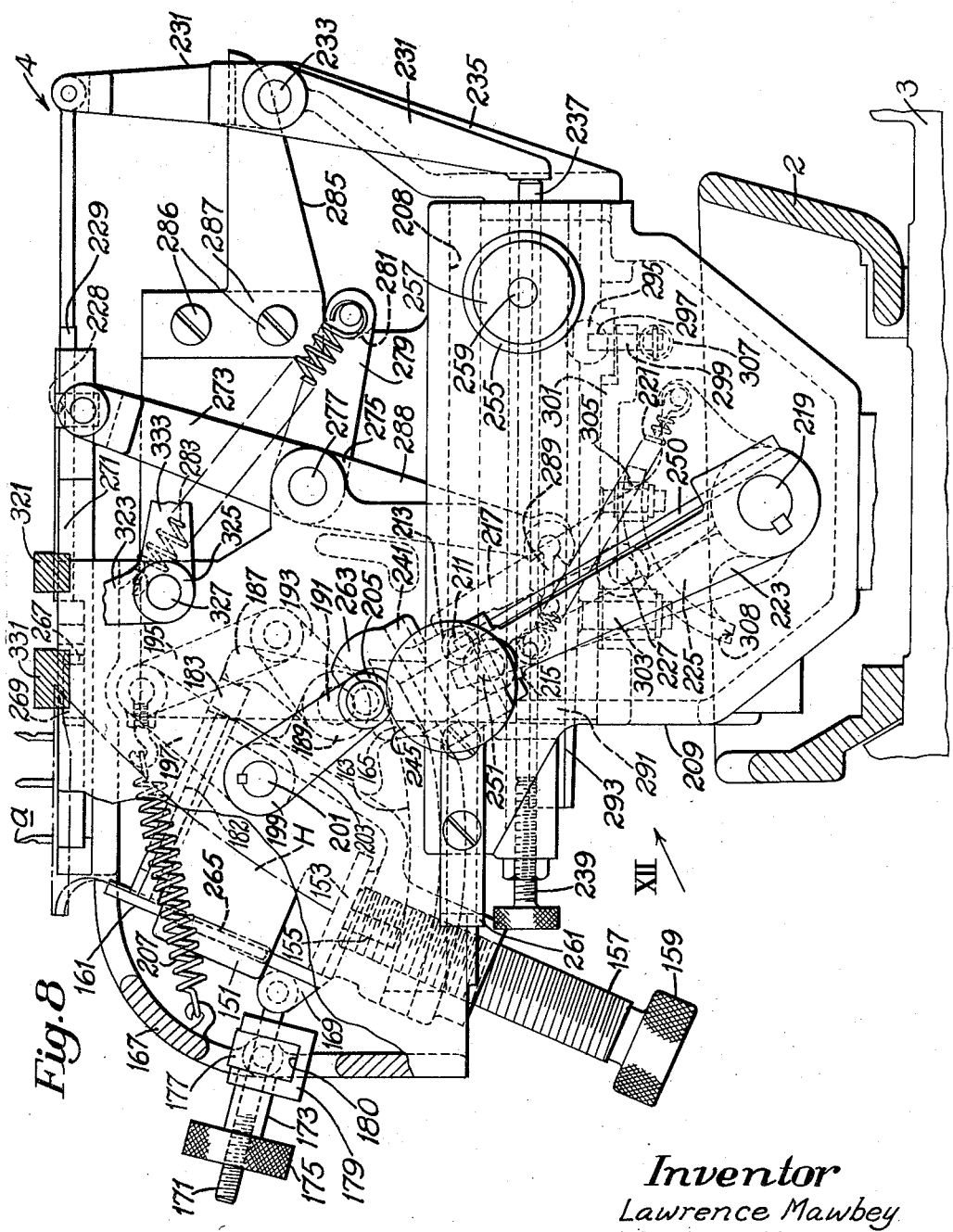
Fig. 8 is a view showing, partly in side elevation and partly in section, portions of heel holding mechanism of the illustrative machine.
Figure 9:
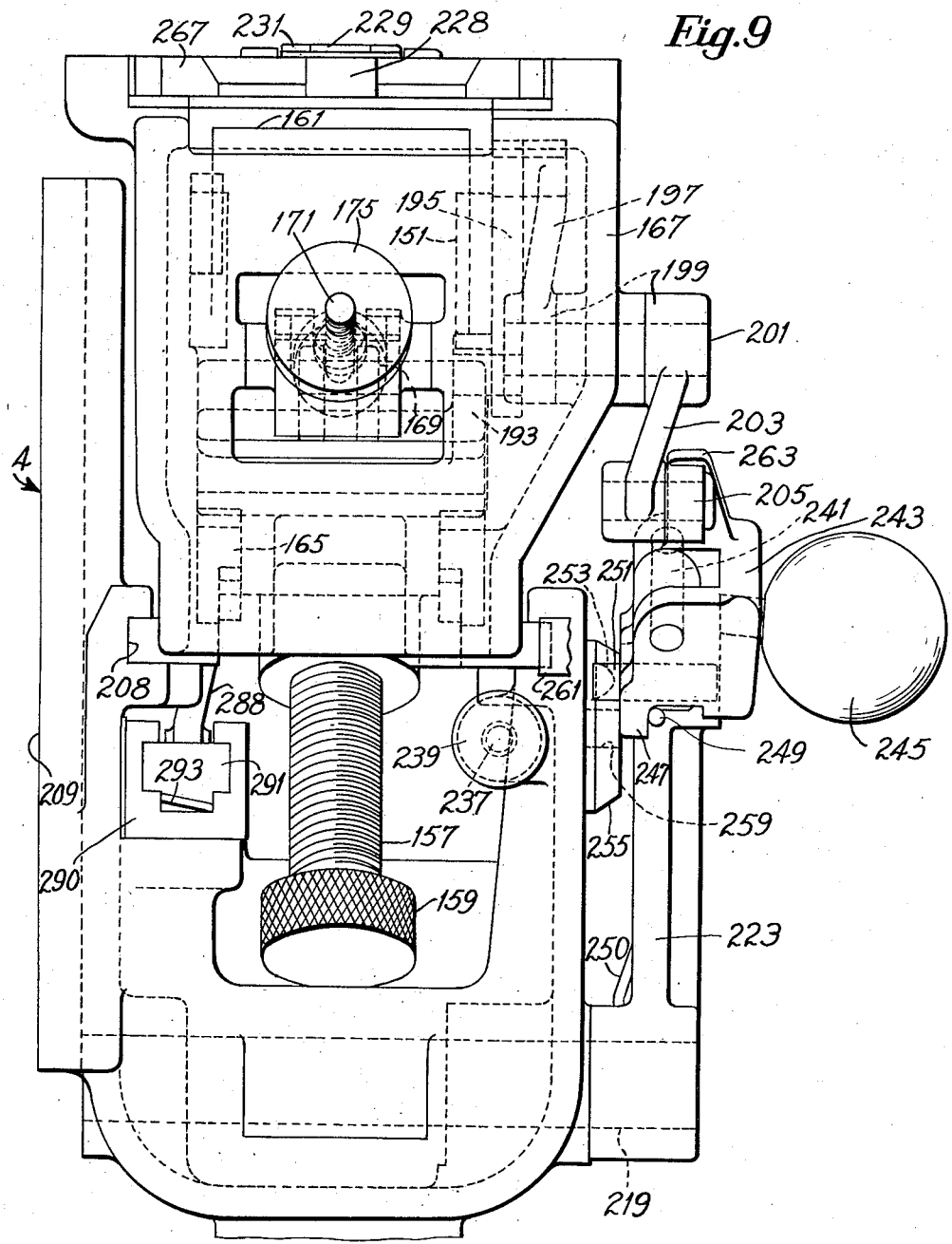
Figs. 9 and 10 are front and rear views, respectively, partly broken away, of the heel holding mechanism.

The heel holding unit or jack 4 (Figs. 8 and 11) comprises an open top boxlike member or holder 151 into which the heel H may be readily inserted. The boxlike member 151 has in it a plate or planar abutment 153 on which the tread or top lift receiving face of the heel, which is indicated by dot and dash lines in Fig. 8, is supported. The plate 153 has extending downwardly from it a stem 155 which is positioned in a recess in the upper end portion of a thumb screw 157 threaded into the lower portion of the boxlike member 151. The plate 153 rests on the upper end of the thumb screw 157 and may be readily removed from the boxlike member 151 by lifting it from the screw if it is desired to use a plate of a different size. The thumb screw 157 has a knurled head 159 by which it may be adjusted to raise or lower the plate 153 in accordance with the height of the heel.

The boxlike member 151 has in it a breast plate or planar abutment 161 which is engaged by the breast face of the wood heel H. The breast plate 161 is positioned in a pair of grooves 160 at the front of the boxlike member 151 and may be changed for a plate of different height, according to the height of the heel, by lifting it from the grooves. The breast plate is preferably of such a height that it will engage as much as the breast face of the heel, heightwise thereof, as possible.

The boxlike member 151 has formed in its opposite sides arcuate guideways 163 which are adjustable along arcuate bars 165 secured on the inside of a heel holder support 167. The arcuate guideways 163 and the bars 165 are at least substantially concentric about an axis $a$ (Fig. 8) lying laterally across the heel H above it and through the upper points of the two nails of the six inserted into the heel nearest its breast face when the projecting portions of the nails N have been bent inwardly of the heel. Thus the position of these two nails forwardly or rearwardly will not be affected by angular adjustment of the boxlike member 151 along the arcuate bars 165. The boxlike member 151 may be described as being pivotally mounted for initial adjustment upon the support 167 about the axis $a$ which lies approximately in the general plane of the breast abutment 161 and which extends transversely of and is arranged at a fixed distance from the attaching face of the heel the breast and tread faces of which are in engagement with the breast and tread abutments.

The boxlike member 151 has secured to the front of it a bracket 169 to which is pivoted the rear end of a screw 171. The screw 171 is threaded through a sleeve 173 having on its upper end a knurled head 175. The sleeve 173 has at its rear end a flange 177 which fits in a recess 180 in a block 179 pivoted on the front portion of the heel holder support 167. By rotation of the sleeve 173 in the block 179, which is prevented from moving lengthwise by the flange 177 in the recess 180, the angular position of the boxlike member 151 along the arcuate bars 165 may be varied initially to adjust the heel so that its attaching face is substantially horizontal.

Slidingly mounted in guideways 182 in the upper end portion of the boxlike member 151 for movement forwardly and rearwardly of the heel H in said member is a heel positioning slide 183 which has a concave face 181 and is arranged to engage the rear face of the heel H and to press the breast face of the heel against the breast plate or abutment 161.

The rear end of the heel positioning slide 183 is engaged by an actuating arm 187 of a lever 189 which is pivoted on a horizontal spindle 191, extending laterally of the machine in the boxlike member 151, and extends upwardly and rearwardly from the spindle. Another arm 193 of the slide lever 189 also extends upwardly and rearwardly from the spindle 191 and is pivotally connected to one end of an upwardly and forwardly extending link 195 the other end of which is pivotally connected to an arm 197 which is secured on a horizontal spindle 201 rotatable in the heel holder support 167, said arm extending upwardly and rearwardly from the spindle. The other arm 203 secured on the spindle 201 extends downwardly and rearwardly from the spindle and has on it a roll 205, hereinafter referred to. The arms 197, 203 form an actuating lever 199. A tension spring 207, rear and forward end portions of which are attached to the arm 197 of the actuating lever 199 and to the heel holder support 167, constantly urges the heel positioning slide 183 toward the breast plate or abutment 161. The slide 183 may be referred to as a clamp for orienting and securing the heel H in the boxlike member or holder 151.

The heel H being loaded in held down in the boxlike member 151 by two holddown plates 309 which are mounted on the heel holder support 167 and engage the rim of the attaching face of the heel around its margin. The holddown plates 309 are formed at the front ends of the levers 311, 313 pivoted on studs 315 secured in the heel holder support 167. The levers 311, 313 have inwardly extending arms connected by gear teeth 317 so that said levers move about their studs equally and in opposite directions. The lever 311 has connected to it a tension spring 319 which constantly urges the holddown plates 309 inward or toward each other. An arm 321 of the lever 313 is held by the spring 319 against an arm 323 of a lever 325 which is pivoted on a stud 327 secured in the heel holder support 167. The spring 319 also holds the arm 323 against an adjustable screw 329 in a lug 331 of the heel holder support 167. By adjustment of the screw 329 the distance apart of the holddown plates 309 may be varied. The lever 325 has a rearwardly extending arm 333 which may be depressed by the operator after the heel H has been loaded and the holder support 167 and heel holder 151 have been moved to a forward or heel receiving position, to cause the plates 309 to be swung from their heel overlapping positions preparatory to removing the loaded heel from the machine. The holddown plates or members 309 may be described as being adapted to move into overlying relation with the attaching face of the heel and as insuring against lengthwise movement of the heel out of the holder 151 and also as assisting in maintaining the heel against displacement in the holder.

The heel holder support 167 is slidingly mounted in horizontal guideways 208 in a heel support frame 209 which, as above explained, is mounted for vertical movement in the guide bracket 2 secured to the main frame 3. The plunger 16, which is screwed to a depending portion of the support frame 209, has secured to it a bearing pin 214 upon which is journaled an arm 216 pivotally connected to an arm 218 formed on a sleeve 220 secured to a shaft 222 journaled in the main frame 3. Formed on the sleeve 220 is an arm 224 pivotally connected to a rod 226 which is operatively connected to mechanism comprising a cam (not shown) movable in timed relation with the countershaft 75 the construction and operation being such that, after the nails N have been driven into the attaching face of the heel and have had their projecting portions bent into parallel relation, as above described, the heel support frame 209 is temporarily moved to a lowered inactive position to draw the parallel projecting portions of the nails N out of the passages 9 of the nozzles 7 and after said nozzles have been raised to their starting positions the heel support frame is again moved to a raised active position by the plunger 16.

Figure 10:
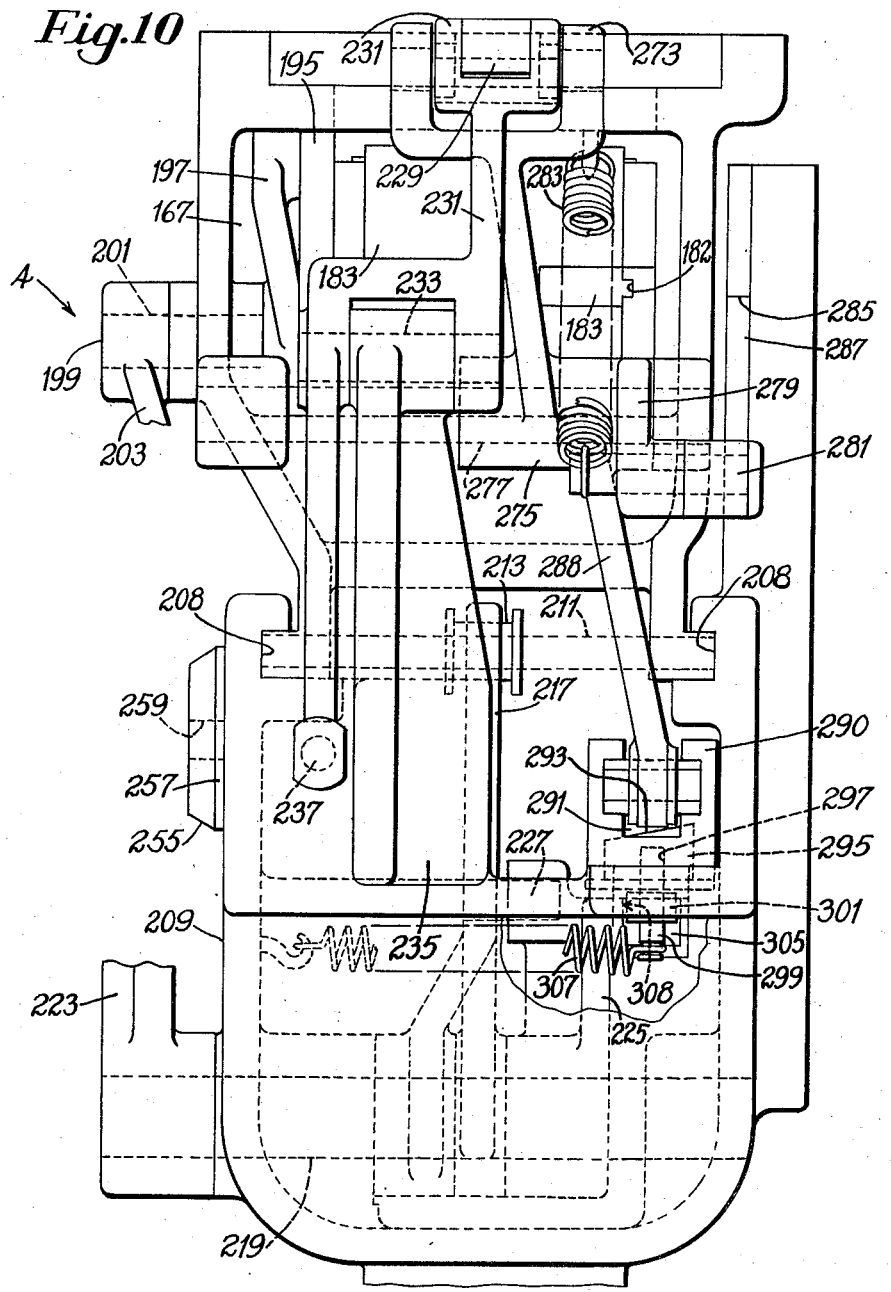

The heel holder support 167 carries a horizontal roll 211 (Figs. 8 and 10) which extends laterally of the machine and on which is mounted a roll 213 engaged at its front and rear by a pair of front and rear yieldable arms 215, 217 which are pivoted on a horizontal laterally extending shaft 219 rotatably mounted in the heel support frame 209. The yieldable arms 215, 217 are held against the roll 213 by a tension spring 221 connected to the arms and urging them toward each other. The laterally extending shaft 219 has secured on its right hand end portion outside the heel support frame 209 a hand lever 223 and an arm 225 inside the heel support frame 209. The arm 225 extends upwardly from the shaft 219 and has secured in its upper end portion a pin 227 extending between the yieldable arms 215, 217. When the hand lever 223 is moved rearwardly from a forward position, shown in Fig. 8, the pin 227 moves the rear yieldable arm 217 in the same direction and, through the tension spring 221 connected to the yieldable arms, the front arm 215 also moves with the hand lever and by its engagement with the roll 213 in the heel-holder support 167 moves the heel-holder support rearwardly along the guide-ways 208 in the heel-support frame 209. The heel-holder support 167 moves in this direction until the rear upper end of the heel H is moved to its heel loading position into engagement with a face 228 of a stop member or back gage 229 adjustably mounted in a supporting slide 271, hereinafter referred to. The hand lever 223 is then moved further in the same direction, being allowed to do so by the tension spring 221 connected to the two yieldable arms, and at the end of such further movement of the hand lever, the hand lever is locked against forward movement by means hereinafter described.

The rear end portion of the stop member 229 is pivotally connected to the upper end portion of a lever 231 which is pivoted on a spindle 233 mounted in a bracket 235 which is secured on the heel support frame 209. The lower end portion of the lever 231 is engaged by a rod 237 which is slidingly mounted in the heel support frame 209. The front end of the rod 237 is engaged by a screw 239 adjustably mounted in the heel support frame 209. By adjusting the screw 239 the position, forwardly or rearwardly, of the stop member 229 may be adjusted.

The upper end portion of the hand lever 223 has secured to it a forwardly and rearwardly extending pin 241 on which is pivoted a lock-bolt lever 243 (Fig. 12) having secured to it a knob 245 by which it may be moved about the pin. The lock-bolt lever 243 has a downwardly extending lug 247 which is arranged to engage a pin 249 secured in a lock bolt 251 which is slidingly mounted in the hand lever 223. The pin 249 is engaged by a leaf spring 250 secured in the hand lever 223. When, as above described, the hand lever 223 is moved further rearwardly after movement of the heel-holder support 167 has been arrested, a beveled face 253 on the lock bolt rides up a beveled face 255 (Fig. 8) on a boss 257 secured on the heel support frame 209 and is caused by the spring 250 to snap into a hole 259 (Fig. 8) in the boss to lock the hand lever against movement. The lock bolt 251 is released by moving the knob 245 upwardly, whereafter the hand lever 223 may be moved forwardly to move the heel-holder support 167 forwardly until it comes into engagement with a stop member 261 (Fig. 8) secured to the heel-support frame 209. When forward movement of the heel-holder support 167 has been arrested, movement of the rear yieldable arm 217 is also arrested by the roll 213 in the heel holder support 167 and the hand lever may be moved further forwardly and as it is so moved the front yieldable arm 215 is moved with it and an upwardly extending arm 263 on the lock-bolt lever 243 engages the roll 205 on the actuating lever 199 and through the actuating lever moves the arm 187 of the slide lever 189, which arm engages the rear end of the heel positioning slide 183, in a direction away from the rear end of the slide 183. A wire spring 265 mounted on the breast gage plate 161 causes the heel positioning slide 183 to follow the arm 187 and move away from the breast plate 161 so that a heel may be placed on the heel supporting plate 153 in the boxlike member or holder 151 in its heel receiving position. When the hand lever 223 is released the spring 221 connected to the two yieldable arms 215, 217 returns the hand lever until the front yieldable arm 215 engages the roll 213 in the heel holder support 167 and the spring 207 connected to the actuating lever 199 moves the heel positioning slide 183 into engagement with the rear of a heel, which has been placed in the heel holder, to press the heel against the breast gage plate 161. Although a heel H has been shown, in dot-and-dash lines in Fig. 8 the machine parts are shown in the positions they occupy when no heel is in the heel holding mechanism.

To support the attaching face of the heel H during the insertion of the nails N into the heel H and the bending of the portions of said nails projecting beyond the heel a pair of supporting plates 267, which may be referred to as clamps, are provided. Inner adjacent edges of the supporting plates 267 are beveled downwardly and inwardly and are so shaped that they engage the heel H just below its attaching face along the sides and part-way around the rear end of the heel.

The supporting plates 267 are pivoted on vertical bosses 269 journaled in the aforesaid supporting slide 271 which is slidingly mounted for forward and rearward movement in the aforementioned heel-holder support 167. The supporting slide 271 is pivotally connected to the upper end portion of an arm 273 of a supporting slide lever 275 which is pivoted on a horizontal laterally extending spindle 277 carried by the heel holder support 167 at the rear thereof. A second and rearwardly extending arm 279 of the supporting slide lever 275 carries a cam roll 281 which is held, by a tension spring 283 connected to the arm 279 and to the heel holder support 167, against a cam face 285 on the underside of a bracket 287 secured by screws 286 to the heel-support frame 209. The supporting slide lever 275 has a third and downwardly extending arm 288 which is operatively connected by a forwardly extending link 289 to a horizontal forwardly and rearwardly extending locking slide 291 slidingly mounted in a block 290 secured to the heel-support frame 209. A lower face 293 (Fig. 8) of the locking slide 291 is slightly inclined downwardly and rearwardly and also downwardly and to the left viewed from the rear. The lower face of the locking slide 291 is arranged to be engaged by the upper face of a locking member 295 which is slidingly mounted for movement laterally of the locking slide in the block 290. The locking member 295 has in its underside a recess 297 which is engaged by a vertical pin 299 secured in a locking lever 301 which is pivoted on a vertical stud 303 secured in the heel-support frame 209. The locking lever 301 has on it, between its ends, a cam roll 305 which is held by a tension spring 307 connected to the pin 299 and to the heel-support frame 209 against a cam face 308 on the aforesaid arm 225 which is secured on the same shaft 219 as the hand lever 223.

As the heel holder support 167 is moved rearwardly from its heel receiving position the cam roll 281 rides along the under face 285 on the bracket 287 and allows the supporting slide 271 and supporting plates 267 to be moved by the spring 283 toward the heel H in the boxlike member or holder 151 and at the same time the heel holder support 167 is carrying the heel toward the supporting plates. The supporting plates 267 are thus caused to engage the sides and rear portion of the heel H just below its attaching face and as will hereinafter appear are locked against movement away from the heel. When the supporting plates 267 have engaged the heel they are held against the heel by the tension spring 283 and as the heel-holder support continues to be moved rearwardly the cam roll leaves the face 285 on the bracket 287.

As the cam roll 281 moves along the face 285 on the bracket 287 and the heel holder support 167 moves rearwardly, the downwardly extending arm 288 of the supporting slide lever 275 causes through the link 289 the locking slide 291 to move rearwardly and its lower face 293 to move above the locking member 295 into position to be engaged thereby and locked against movement in the opposite direction. When the hand lever 223 is moved rearwardly as aforesaid, the cam face 308 on the arm 225 allows the locking member 295 to be moved into engagement with the locking slide 291 by the spring 307 to lock the slide against forward movement. Locking of the slide 291 secures the supporting plates 267 against rearward movement away from the heel H when pressure is exerted against the attaching face of the heel.

When it is desired to move the heel holder support 167 forwardly the knob 245 is raised and causes the lock bolt 251 to be withdrawn from the hole 259 in the boss 257 on the heel support frame 209. The hand lever 223 is then moved forwardly and during the first part of its movement the cam face 308 on the arm 225 operating through mechanism above described moves the locking member 295 away from the locking slide 291 against the action of the spring 307 to allow said slide to be moved forwardly. Upon further forward movement of the hand lever 223 the pin 227 in the arm 225 acts upon the front yieldable arm 215 and through the tension spring 221 moves the heel holder support 167 and accordingly the boxlike member or holder 151 forwardly until its movement is arrested by the aforesaid stop member 261. Still further forward movement of the hand lever, during which the tension spring 221 yields, allows the heel-positioning slide 183 to be moved by the aforesaid wire spring 265 away from the breast gage plate 161 so that a heel may be placed in the heel holder. The jack 4 may be described as having manually actuated means for moving the heel-holder support 167 on the support frame 209 between heel receiving and heel loading positions in a path disposed at approximately right angles to the fixed path of vertical movement of the support frame.

Figure 14:
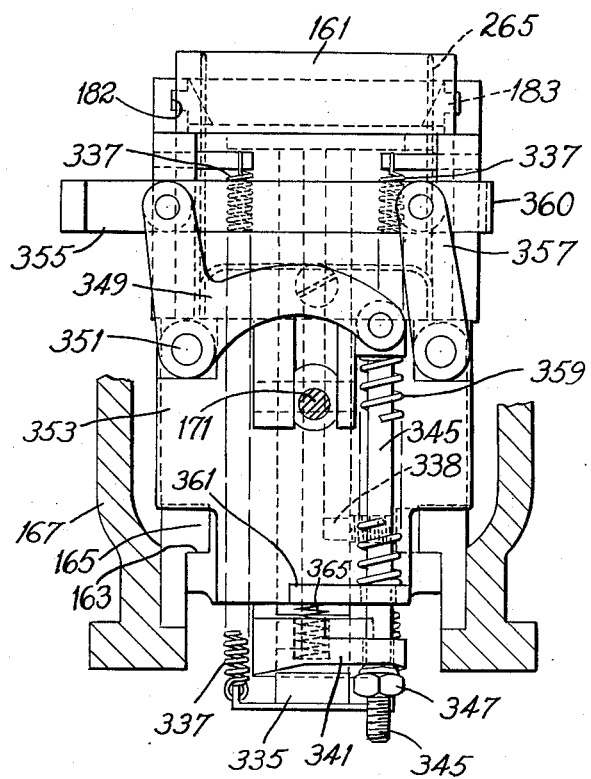
Fig. 14 illustrates portions of the heel holding mechanism shown in Fig. 13 as viewed on the line XIV—XIV of Fig. 13.

Instead of the aforesaid adjustable screw 157 and plate or abutment 153 for supporting the heel by its tread or top lift receiving face in the boxlike member or holder 151, the boxlike member, as illustrated in Figs. 13, 14 and 15, may preferably have in it a heel-supporting slide 335 on the upper end of which the tread face of the heel H is supported. The slide 335 is movable along a guideway 336 and is normally held, by tension springs 337 attached at their lower ends to the slide and at their upper ends to the boxlike member 151, in a raised position, upward movement of the slide 335 in said guideway being limited by the engagement of a screw 338 in the boxlike member with the bottom end of a recess 340 (Fig. 13) in the slide. When the heel H is presented to the heel holder 167 the slide 335 is pushed down by the engagement of its tread face with the upper end of the slide, the heel being pushed down by the operator between the holddown plates 309 which yield outwardly or spread apart and, when the heel has been pushed down far enough, close over the top of the marginal portions of the attaching face of the heel to prevent the heel from being moved upwardly thereafter and thus to position the heel heightwise.

To lock the slide 335 against downward movement during the nail inserting and subsequent heel attaching operations the lower portion of the boxlike member 151 has pivoted to it, rearwardly of the slide, on a horizontal laterally extending pin 339 a locking arm 341 which extends forwardly from the pin. The lower end portion of the slide 335 passes through an opening 343 in the locking arm. The opening 343 in the arm 341 is so formed that when the arm is substantially at right angles to the slide the slide may move freely through the opening, and when the arm is moved down from this position the front and rear faces, which are beveled as shown in Fig. 13, of the opening bind against the front and rear faces of the slide 335 and lock the slide against downward movement. The locking arm 341 has passing through its front end portion, in front of the opening, the lower end portion of a rod 345. The rod 345 below the arm has adjustably mounted on it a nut 347 which is arranged to engage the lower side of the arm 341. The upper end portion of the rod 345 is pivotally connected to the right hand end portion (as viewed in Fig. 14) of a substantially horizontal arm of a bell-crank lever 349 which is pivoted on a forwardly and rearwardly extending stud 351 secured in a plate 353 fixed on the front of the boxlike member 151. The bell-crank lever 349 has an upwardly extending arm to the upper end portion of which is pivoted the left hand end portion (as viewed in Fig. 14) of a substantially horizontal bar 355. The right hand end portion of the bar 355 is pivoted to the upper end portion of a guiding arm 357 which is pivoted on said plate 353 and is parallel to the upwardly extending arm of the bell-crank lever 349, the bar 355 being guided for horizontal movement. The rod 345 has on it a compression spring 359 which is confined between a head on the upper end of the rod and a forwardly projecting shelf 361 on said plate 353 through which the rod passes.

When the heel holder support 167 is in its forward or heel receiving position a lug 360 on the right hand end of the bar 355 is held against the boxlike member 151 by the spring 359 on the rod 345 and the locking arm 341 is held raised by the nut 347 on the lower end of the rod 345 so that the heel-supporting slide 355 may be moved down when a heel is placed in the heel holding mechanism. As the heel holder support 167 is moved rearwardly to its heel loading position to carry the heel H therein beneath the nailing mechanism the bar 355 is moved, by a cam face 363 (Fig. 15) on the heel support frame 209 to the right, as viewed in Fig. 14, and as it is so moved the nut 347 on the lower end portion of the rod 345 is moved downwardly and allows the locking arm 141 to be moved downwardly by a compression spring 365 between the shelf 361 and the arm to cause the locking arm to lock the heel-supporting slide 335 against downward movement during the insertion of the nails into the heel and the bending of projecting portions of the nails into parallel relation.

Having thus described my invention, what I claim as new and desire to secure by Letters Patent of the United States is:

1. In a nailing machine, a support for a work piece, means for simultaneously driving a plurality of nails in toed-in relation part way into the work piece thereby leaving portions of said nails projecting beyond the work piece, and means for simultaneously bending as entireties the projecting portions of said nails toward one another into substantially parallel relation.

2. In a heel loading machine, means for holding a heel in a predetermined position, means for simultaneously driving a plurality of nails in toed-in relation part way into the heel thereby leaving portions of said nails projecting beyond the heel, and means for simultaneously bending as entireties the projecting portions of the nails toward one another into substantially parallel relation.

3. In a nailing machine, a support for a work piece, means comprising nozzles mounted for translatory movement to drive nails respectively in nonparallel relation part way into the work piece thereby leaving portions of said nails projecting beyond said work piece, and means for swinging respectively said nozzles transversely of their paths of translatory movement to bend into substantially parallel relation the portions of the nails projecting beyond said work piece.

4. In a heel loading machine, means for holding a heel in a predetermined position, means comprising nozzles mounted for translatory movement for driving nails respectively part way into the heel leaving portions of the nails projecting in nonparallel relation beyond the heel, and means for swinging the nozzles respectively transversely of their paths of translatory movement to bend into substantially parallel relation the portions of the nails projecting beyond the heel.

5. In a nailing machine, means for holding a work piece in a predetermined position, means for orienting a plurality of nails in nonparallel relation, means for driving said nails part way into the work piece while maintaining them oriented thereby leaving portions of said nails projecting beyond the work piece, and means for bending portions of the nails projecting beyond the work piece into substantially parallel relation.

6. In a heel loading machine, means for holding a heel in a predetermined position with an attaching face thereof exposed, means for orienting a plurality of nails in toed-in relation to the attaching face of the heel, means for driving said nails in toed-in relation part way into the attaching face of the heel while maintaining them oriented thereby leaving portions of the nails projecting beyond said attaching face, and means for bending the portions of the nails projecting beyond said attaching face of the heel into substantially parallel relation.

7. In a nailing machine, means for holding a work piece in a predetermined position, a plurality of nozzles having passages respectively for receiving nails, means for driving said nails part way out of the passages of the nozzles and for rotating said nails into predetermined oriented positions in said passages, means for moving associated nozzles, driving means and nails as units in predetermined paths toward the work piece causing portions of the nails projecting beyond said passages to be driven into the work piece and leaving portions of the nails in said passages projecting in nonparallel relation beyond the work piece, and means for swinging the nozzles and accordingly portions of the nails in the passages of the nozzles generally toward one another in paths extending generally transversely of the passages whereby to move said portions of the nails into parallel relation.

8. In a nailing machine, a jack for holding a work piece in a predetermined position, a plurality of nozzles having passages respectively which are adapted to receive nonoriented nails and have exit ends, drivers movable in said passages, means for moving said drivers lengthwise of said passages and for simultaneously therewith rotating said drivers to move said nails part way out of the exit ends of the passages of the nozzles and to rotate said nails into oriented positions in the passages, means for moving associated nozzles, drivers and nails as units in predetermined paths toward the work piece until the exit ends of the nozzles are in approximate engagement with the work piece to cause portions of the oriented nails projecting beyond said passages to be driven into the work piece leaving nonparallel projecting portions of the nails in the passages of the nozzles, means for withdrawing the drivers from said passages of the nozzles while said nozzles are thus positioned, means for swinging the nozzles substantially about their exit ends into positions in which their passages and accordingly the projecting portions of the nails therein are in parallel relation, and means for effecting relative movement of the jack on the one hand and the nozzles and the drivers on the other hand lengthwise of said passages to separate the parallel projecting portions of the nails from the passages of said throats.

9. In a heel loading machine, means for holding a heel, which has a top lift receiving face and an attaching face, in a predetermined position with its attaching face exposed, a plurality of nozzles having converging passages respectively for receiving nonoriented nails, drivers for moving said nails part way out of the passages of the nozzles and for simultaneously rotating, if necessary, said nails into oriented positions in said passages, means for moving associated nails, nozzles and drivers together as units generally lengthwise of the passages toward the attaching face of the heel to force the portions of the nails projecting beyond said passages and accordingly beyond said nozzles in toed-in relation into the attaching face of the heel and leaving nonparallel portions of the nails in the passages projecting beyond said attaching face, and means for swinging the nozzles into positions in which their passages are parallel and are disposed at substantially right angles to the top lift receiving face of the heel whereby to bend portions of the nails projecting beyond the attaching face of the heel into parallel relation and at right angles to said top lift receiving face.

10. In a heel loading machine, a jack, means for securing a heel in the jack with an attaching face of the heel exposed, a plurality of carriers, each having an arcuate guideway and nail delivering and driver receiving bores terminating at said guideway, drivers movable along the driver receiving bores respectively, a plurality of nozzles each having a passage, means for moving the nozzles along the guideways to primary positions, in which said passages are in alinement with the nail delivering bores for receiving nails from said bores, and to second positions in which said passages are in alinement with the nail driver receiving bores for receiving said drivers, means for moving the drivers in said driver receiving bores and in said passages for driving nails part way out of said passages of the nozzles, means for thereafter moving the carriers, the nozzles and the drivers as units in converging paths toward the heel to drive the portions of the nails projecting out of the passages of the nozzles into the attaching face of the heel, means for retracting the drivers from said passages, and means for moving the nozzles in said guideways into positions in which their passages are in parallel relation, thereby bending the projecting portions of the nails into parallel relation.

11. In a heel loading machine, a jack, means for securing a heel in the jack with an attaching face of the heel exposed, a plurality of carriers each having an arcuate guideway and nail delivering and driver receiving bores terminating at said guideway, drivers movable along the driver receiving bores respectively, a plurality of nozzles each having a passage provided with an exit end about which the guideway of the associated carrier is centered, means for moving the nozzles along said guideways to primary positions, in which said passages are in alinement with the nail delivering bores for receiving nails from said bores, and to second positions in which said passages are in alinement with driver receiving bores for receiving said drivers, means for moving the drivers in said driver receiving bores and in said passages for driving nails part way out of said passages of the nozzles and accordingly part way beyond the exit ends of the nozzles, means for thereafter moving the carriers, the nozzles and the drivers as units in converging paths toward the heel to drive the portions of the nails projecting beyond the exit ends of the nozzles into the attaching face of the heel, means for retracting the drivers out of said passages, means for moving the nozzles in said guideways into positions in which their passages are in parallel relation thereby bending the projecting portions of the nails into parallel relation, and means for moving the jack away from the nozzles to remove the bent parallel portions of the nails from the passages of the nozzles.

12. In a heel loading machine, a jack for a work piece, a cylindrical driver having an axis and a beveled end, a plurality of carriers each having an arcuate guideway and nail delivering and driver receiving bores terminating at said guideway, a nozzle which is movable into different angularly adjusted positions in each of said guideways and is provided with a passage terminating at said guideway, means for moving said nozzles in the guideways into positions in which the passages are arranged in register with the nail delivering bores to receive nonoriented nails and are thereafter arranged in register with the driver receiving bores to receive the drivers, a spring extending across the passage in each of the nozzles for retaining the nail in said passage and for rotating it into an oriented position about its axis, means for moving the drivers lengthwise in the passages to drive the nails therein part way out of the nozzles and for simultaneously therewith rotating the drivers in the passages further to insure that the nails shall be oriented about their axes, means for moving associated carriers, nozzles and drivers as units toward the work piece and toward each other to force the portions of the nails projecting beyond the nozzles into the work piece and to leave portions of the nail in the passages and extending beyond the work piece in nonparallel relation, and means for swinging the nozzles in the arcuate guideways of associated carriers to move the portions of the nails left projecting beyond the work piece into parallel relation.

13. In a heel loading machine, a jack for positioning and supporting a heel, a plurality of circumferentially spaced nail driving and bending units each comprising a guide having a slideway, a carrier movable along the slideway of each of the guides and having an arcuate guideway and nail delivering and driver bores communicating with said guideway, a nozzle which has a passage and is movable into different angular positions along said arcuate guideway of the associated carrier, means for moving the nozzles in the guideways to positions in which the passages are in register with the nail delivering bores of the carriers to deliver nails to the passages and for thereafter moving the nozzles to positions in which the passages are in alinement with the driver bores, means for yieldingly retaining the nails in said passages, means for operating the drivers relatively to the carriers and the nozzles in timed relation with the nozzle moving means to force portions of the nails in said passages out of said passages and for thereafter moving associated drivers, carriers and nozzles of said units together toward the heel until the nozzles substantially engage the heel thereby driving the projecting portions of the nails into the heel and leaving portions of the nails in the passages and projecting beyond the heel in nonparallel relation, means for moving the drivers out of said passage, and means for moving the nozzles along the guideways into positions in which the passages are in parallel relation whereby to move the projecting portions of the nails into parallel relation.

14. In a nailing machine, a jack for positioning and supporting a work piece, and a plurality of units for simultaneously driving nails, each of which has opposite flat beveled ends, part way into the work piece and for bending portions of said nails left projecting beyond the work piece into parallel relation, each of said units comprising a nozzle having a passage, means for delivering a nail to the passage, a driver movable in said passage and having a flat beveled end, a leaf spring which extends across a portion of said passage and is adapted to retain the nail in the passage and tends to orient the nail about its axis, and means for sliding said driver part way through said passage to drive the nail approximately half way out of the passage and for rotating the driver to insure that the nail shall be so oriented about its axis that its trailing flat bevelled end shall be engaged by the flat beveled end of the driver by the time the nail has been moved half way out of said passage.

15. In a heel loading machine, a jack for positioning and supporting a heel with its attaching face exposed, and a plurality of units for simultaneously driving nails, each of which has opposite flat beveled ends, part way into the attaching face of the heel and for bending portions of said nails left extending beyond said attaching face into parallel relation, each of said units comprising a nozzle in which is formed a passage having an exit end, means for delivering a nail to the passage, a driver movable in said passage and having a flat beveled end, a leaf spring which extends across an exit portion of said passage and is adapted to retain the nail in the passage and tends to orient said nail about its axis with the leading beveled end of the nail in engagement with the spring, and means for sliding said driver part way through the passage to drive, against the resistance of the spring, the nail approximately half way out of the passage and for rotating the driver to insure that the nail shall be so oriented about its axis that the trailing flat beveled end thereof shall be engaged by the flat beveled end of the driver by the time the nail has been moved half way out of the passage.

16. In a heel loading machine, means for positioning and supporting a heel with its attaching face exposed, a plurality of tapering nozzles each of which has an apex portion and a passage provided with an exit end terminating at said apex portion, means for guiding nails into the passages, means for yieldingly retaining said nails in the passages, means for driving against the action of said last-named means the nails lengthwise of the passages to project the leading portions of the nails beyond the exit ends of the nozzles, means for moving associated projecting nails, nozzles and nail driving means as units in rectilinear paths respectively extending generally lengthwise of the passages until the apex portions of the nozzles are approximately in engagement with the attaching face of the heel thereby driving the projecting portions of the nails into said attaching face of the heel and leaving portions of the nails in the passages and projecting beyond the attaching face of the heel in nonparallel relation, and means for rocking the nozzles substantially about their apex portions into positions in which the passages and accordingly the projecting portions of the nails are arranged in parallel relation.

17. In a heel loading machine, means for positioning and supporting a heel with its attaching face exposed, a plurality of tapering nozzles each of which has an apex portion and a passage having an exit end terminating at said apex portion, means for guiding nails into the passages, means for yieldingly retaining said nails in the passages, means for driving the nails lengthwise of the passages to project the leading halves of the nails beyond the exit ends of the nozzles, means for sliding the projecting nails and the nozzles together in rectilinear paths extending generally lengthwise of the passages until the exit ends of the nozzles are arranged adjacent to the attaching face of the heel whereby to drive the projecting halves of the nails into said attaching face and leaving trailing halves of the nails which are in the passages and project beyond the attaching face of the heel in nonparallel relation, means for rocking the nozzles about axes respectively passing substantially through the exit ends of the passages of the nozzles to positions in which said passages are arranged in parallel relation, means for swinging the nozzles into different initially adjusted positions about axes respectively which are spaced considerable distances from the nozzles and are parallel respectively to the axes about which the nozzles are rocked, and means for retaining the nozzle rocking means, the nail driving means and the nail and nozzle sliding means in the same relative positions during their movement into initially adjusted positions.

18. In a heel loading machine, a jack for positioning and supporting a heel with an attaching face thereof exposed, a plurality of circumferentially spaced nail driving and bending units each comprising a guide having a slideway which extends toward and away from the attaching face of the heel and is in converging relation with the slideways of the guides of the other units as it approaches said attaching face, a carrier which is movable along the slideway of an associated guide and has an arcuate guideway and which has a nail delivering bore and a driver bore communicating with said guideway, a nozzle which is mounted on an associated carrier and is movable into different positions along the arcuate guideway of the carrier and which has a passage communicating with said guideway, a driver movable along the driver bore of the associated carrier, means comprising a nozzle actuating lever for moving the nozzle along the guideway of the associated carrier to positions in which the passage of the nozzle is moved successively into alinement with the nail delivering and driver bores of the carrier thereby causing a nail in the delivering bore to drop into said passage and then to be moved into register with the driver bore, means for yieldingly retaining the nail in the passage, means comprising a driver actuating lever for moving the driver relatively to the carrier and the nozzle to cause the nail in said passage to be moved, against yielding action of said nail retaining means, part way out of said passage, means comprising a carrier actuating lever cooperating with the last-named means to move the carrier and the associated nozzle and driver as a unit toward the attaching face of the heel until the nozzle substantially engages said attaching face thereby forcing the portion of the nail projecting beyond the nozzle into the attaching face and leaving portions of the nails of the various units projecting beyond the attaching face of the heel in nonparallel relation, means for causing the driver of the associated unit to be withdrawn from the passage of the nozzle of the unit, said first-named means, after the nails have been driven into the attaching face of the heel, being adapted to swing the nozzles in the guideways respectively of the carriers of associated units into positions in which their passages and accordingly the portions of the nails in said passages are arranged in parallel relation, and means for angularly adjusting the guide of each of the units initially into different positions about an axis to vary the convergency of the slideways of said guideways of the units respectively and accordingly the convergency of the driver bores and the passages of the nozzles as they approach the heel, said nozzle, driver and carrier actuating levers of each of the units, when the driver bore of the carrier and the passage of the nozzles are in alinement, being movable substantially about said axis thereby insuring that the positions of the carriers in the slideways, the nozzles in the guideways and the drivers in the driver bores of the carriers shall not be changed when the guides are angularly adjusted initially about the axis.

19. In a heel loading machine, a heel holder, means for positioning a heel in and clamping it to the holder, means for moving the holder between a heel receiving position and a heel loading position, mechanism for driving nails in toed-in relation part way into the attaching face of the heel and for thereafter bending portions of the nails projecting beyond said attaching face into parallel relation, means for causing said mechanism to come to rest temporarily after the nails have been bent, and means for moving the holder away from said mechanism while said mechanism is at rest.

20. In a heel loading machine, nail driving and bending mechanism, a heel support frame movable in a fixed path toward and away from said nail driving and bending mechanism, a holder support, a heel holder pivotally mounted for initial adjustment upon the support, manually actuated means for moving the support on said frame in a path disposed at substantially right angles to said fixed path between a heel receiving position and a heel loading position, a clamp responsive to movement of said last-named means for positioning and securing a heel to said holder, and powered means for operating in timed relation the nail driving and bending mechanism and the heel support frame.

21. In a heel loading machine, a jack for orienting and clamping in a predetermined position a heel with substantially the entire attaching face thereof exposed, and means for driving nails in toed-in relation part way into the attaching face of the heel and for bending portions of the nails left projecting beyond said face into parallel relation, said jack comprising a support frame, a heel holder support, a heel holder which is adapted to receive a heel and is mounted for initial adjustment on the heel holder support, a gage adjustably mounted on the support frame, mechanism for moving the holder support on the support frame between a heel receiving position in which the heel is placed in the holder and a heel loading position determined by the engagement of the heel with the gage, and means responsive to movement of the heel holder support on said frame for positioning and clamping the heel in the holder as the holder moves to its loading position.

22. In a heel loading machine, a support frame movable between raised active and lowered inactive positions, a heel holder support slidingly mounted upon the support frame, a heel holder adjustably mounted upon the support, means for moving the support and accordingly the holder between heel receiving and heel loading positions, said holder comprising abutments adapted to be engaged respectively by the breast and tread faces of a wood heel, members which are journaled on the support and are adapted to override a portion of the rim of the attaching face of the heel in the holder and which insure against heightwise movement of the heel out of the holder, a clamp adapted to be forced against the rear end of the heel to centralize said heel in and to secure it to the holder, supporting plates adapted to engage the rear and the side faces of the heel, which has been positioned and secured in the holder, just below the rim of the attaching face of the heel whereby to assist in supporting the heel against displacement in the holder, a back stop adjustably mounted on the holder support, and means comprising a lever for moving the holder support and accordingly the holder from its heel receiving position to its heel loading position determined by the engagement of the rear end of the heel with the back stop, means responsive to movement of the last-named means for moving the clamp against the rear end of the heel and thereafter the supporting plates against the side and rear faces of the heel, means for locking the holder support in its heel loading position in the support frame, and means for driving nails into the attaching face of the heel.

23. In a heel loading machine, a support frame, a heel holder support, a heel holder mounted for initial adjustment upon the support, mechanism for positioning and clamping a heel in the holder with portions of the attaching face of the heel exposed, a gage adjustably mounted on the frame, means for moving the support on said frame for rendering said mechanism active to position and to clamp the heel in the holder and to cause the holder to travel from a heel receiving position to a heel loading position determined by the engagement of the positioned heel in the holder with the gage, means responsive to movement of the support on the frame for locking the support in its heel loading position and for maintaining the heel positioned and clamped in the heel holder, power operated means for driving nails part way into the attaching face of the heel and for bending portions of the nails projecting beyond said face into parallel relation, and means for moving the frame and accordingly the support and the heel holder as a unit toward and away from the nail driving and bending means.

24. In a heel loading machine, nail driving and bending means, a heel support frame movable away from and toward said nail driving and bending means in a fixed path between active and inactive positions, a holder support, a heel holder which is mounted on said holder support and comprises planar breast and tread abutments adapted to be engaged by breast and tread faces respectively of a heel positioned in the holder, means for initially adjusting the tread abutment along the breast abutment in accordance with the height of the heel to be operated upon, means for angularly adjusting the heel holder initially upon the holder support about an axis which lies approximately in a plane of the breast abutment and which extends transversely of and is arranged at a fixed distance beyond the attaching face of a heel the breast and tread faces of which are in engagement with said abutments of the holder, means for moving between heel receiving and heel loading positions the holder support on the support frame in a path disposed at right angles to the fixed path of movement of the support frame, means responsive to movement of said last-named means for forcing the breast and tread faces of the heel against the breast and tread abutments of the holder and for positioning and securing the heel against movement on the holder, and power means for operating the nail driving and bending means and the heel support frame in timed relation.

25. In a heel loading machine, a jack for positioning and supporting a heel, means for driving nails into the heel, said jack comprising a heel holder having breast and tread abutments adapted to be engaged by breast and tread faces of the heel, a slide adapted to be forced against the central rear end portion of the heel to position the heel in the holder and to clamp it against said abutments, a pair of holddown plates which are adapted to be moved into overlying relation with the rim of the attaching face of the heel clamped against said abutments, support plates which are adapted to be moved into engagement with the rear and side faces of the heel just beneath the attaching face of the heel clamped against said abutments, a holder support, means for pivotally adjusting the holder initially upon the support, a support frame on which the heel holder support is mounted for movement to move the support and accordingly the holder between heel receiving and heel loading positions, mechanism responsive to movement of the holder support on the frame to its heel loading position for forcing said slide into engagement with the heel and for thereafter moving the support plates into forced engagement with the heel, and means for locking the holder support and the holder in their heel loading positions to the support and for securing the support plates in forced engagement with the heel.

26. In a heel loading machine, a holder for a heel, nail driving and bending mechanism, means for moving the holder from a heel receiving position to a heel loading position adjacent to the nail driving and bending mechanism, said holder comprising spring actuated mechanism for supporting the heel, a breast abutment, a tread abutment which is slidingly mounted for movement along the breast abutment and which is constantly urged in one direction by said spring actuated mechanism and is adapted to be moved in an opposite direction by pressure exerted by a heel manually inserted into the holder, a pair of holddown plates which are adapted to be spread apart under pressure of the heel as it is forced against said tread abutment and which, when the heel has been forced beyond said plates, close over marginal portions of the attaching face of the heel thereby limiting movement of the heel acted on by said spring actuated mechanism along the breast abutment after the heel has been released by the operator, means responsive to movement of the holder to its loading position for locking the tread abutment against movement in the holder and for positioning the heel in and clamping it securely to the holder, and means for operating the first-named mechanism to drive portions of nails into the attaching face of the heel leaving remaining portions of the heel projecting beyond the attaching face of the heel in nonparallel relation and also for bending said portions of the nails projecting beyond said attaching face into parallel relation.

27. In a heel loading machine, a holder for a heel, nozzles having passages for receiving nails, drivers movable in said passages, means for operating the drivers to move the nails part way out of said nozzles, means for moving the holder from a heel receiving position to a heel loading position, said holder comprising spring actuated mechanism for supporting the heel, a breast abutment, a tread abutment which is slidingly mounted for movement along the breast abutment and which is constantly urged in one direction by said spring actuated mechanism and is adapted to be moved in an opposite direction by pressure exerted by a heel manually inserted in the holder, a pair of holddown plates which are adapted to be spread apart by the heel as it is forced by the operator against the tread abutment and which, when the heel has been forced beyond said plates, close over the attaching face of the heel thereby limiting movement of the heel acted upon by said spring actuated mechanism after the heel has been released by the operator, means responsive to movement of the holder to the loading position for locking the tread abutment against movement with relation to the breast abutment and for positioning the heel widthwise and clamping it securely to the holder, means for moving the nozzles and associated drivers together as units toward the holder in its loading position to drive the nails in toed-in relation into the attaching face of the heel, means for retracting the drivers from the passages of the nozzles, means for swinging the nozzles into positions in which their passages are in parallel relation to bend portions of the nails projecting beyond the attaching face of the heel into parallel relation, and means for causing the nozzles to dwell and the holder to move away from the nozzles after the nails have been bent whereby to withdraw the nails in the loaded heel from the passages of the nozzles.

References Cited in the file of this patent

UNITED STATES PATENTS

| | | |
|---|---|---|
| 21,325 | Dewey | Aug. 31, 1858 |
| 1,625,869 | Plympton | Apr. 26, 1927 |
| 2,438,793 | Vogel | Mar. 30, 1948 |

FOREIGN PATENTS

| | | |
|---|---|---|
| 8,926 | Norway | Nov. 26, 1900 |